United States Patent
Yang et al.

(10) Patent No.: US 10,852,990 B2
(45) Date of Patent: Dec. 1, 2020

(54) HYBRID FRAMEWORK OF NVME-BASED STORAGE SYSTEM IN CLOUD COMPUTING ENVIRONMENT

(71) Applicant: Samsung Electronics Co., Ltd., Suwon-si (KR)

(72) Inventors: Zhengyu Yang, Malden, MA (US); Morteza Hoseinzadeh, La Jolla, CA (US); Ping Wong, San Diego, CA (US); John Artoux, La Mesa, CA (US); T. David Evans, San Marcos, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 15/821,699

(22) Filed: Nov. 22, 2017

(65) Prior Publication Data

US 2019/0042151 A1    Feb. 7, 2019

Related U.S. Application Data

(60) Provisional application No. 62/540,555, filed on Aug. 2, 2017.

(51) Int. Cl.
*G06F 3/06* (2006.01)
*G06F 9/455* (2018.01)

(52) U.S. Cl.
CPC ............ *G06F 3/0659* (2013.01); *G06F 3/061* (2013.01); *G06F 3/0611* (2013.01); *G06F 3/0664* (2013.01); *G06F 3/0679* (2013.01); *G06F 3/0683* (2013.01); *G06F 9/45558* (2013.01); *G06F 2009/45579* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| 6,765,873 B1 | 7/2004 | Fichou et al. |
| 7,571,247 B2 | 8/2009 | Banerjee et al. |

(Continued)

OTHER PUBLICATIONS

A. M. Caulfield et al., "Providing safe, user space access to fast, solid state disks," ACM SIGARCH Computer Architecture News, vol. 40, No. 1, pp. 387-400, 2012.

(Continued)

*Primary Examiner* — Michael Alsip
(74) *Attorney, Agent, or Firm* — Renaissance IP Law Group LLP

(57) ABSTRACT

A non-volatile memory (NVM) express (NVMe) system includes at least one user application, an NVMe controller and a hypervisor. Each user application runs in a respective virtual machine environment and including a user input/output (I/O) queue. The NVMe controller is coupled to at least one NVM storage device, and the NVMe controller includes a driver that includes at least one device queue. The hypervisor is coupled to the user I/O queue of each user application and to the NVMe controller, and selectively forces each user I/O queue to empty to a corresponding device queue in the driver of the NVMe controller or enables a private I/O channel between the user I/O queue and a corresponding device queue in the driver of the NVMe controller.

18 Claims, 6 Drawing Sheets

(56) References Cited

U.S. PATENT DOCUMENTS

| | | | |
|---|---|---|---|
| 9,747,039 B1* | 8/2017 | Coleman | G06F 3/061 |
| 2008/0225842 A1* | 9/2008 | Goldfein | H04L 1/1825 |
| | | | 370/389 |
| 2015/0317088 A1* | 11/2015 | Hussain | G06F 3/0664 |
| | | | 711/103 |
| 2016/0077740 A1* | 3/2016 | Hussain | G06F 3/0619 |
| | | | 711/103 |
| 2016/0077984 A1* | 3/2016 | Steinert | G06F 13/1642 |
| | | | 710/309 |
| 2016/0248770 A1 | 8/2016 | Novack et al. | |
| 2016/0259568 A1 | 9/2016 | Grimsrud et al. | |
| 2016/0306549 A1* | 10/2016 | Nadakuditi | G06F 3/061 |
| 2017/0041296 A1 | 2/2017 | Ford et al. | |
| 2017/0118251 A1 | 4/2017 | Roth et al. | |
| 2017/0199887 A1 | 7/2017 | Fullbright et al. | |
| 2017/0242722 A1* | 8/2017 | Qiu | G06F 3/061 |

OTHER PUBLICATIONS

H.-J. Kim et al., "Nvmedirect: A user-space i/o framework for application-specific optimization on nvme ssds." in Hot-Storage, 2016.

J. Condit et al., "Better i/o through byte-addressable, persistent memory," in Proceedings of the ACM SIGOPS 22nd symposium on Operating systems principles, ACM, 2009, pp. 133-146.

J. Huang et al., "Flashblox: Achieving both performance isolation and uniform lifetime for virtualized ssds." in FAST, 2017, pp. 375-390.

J. Yang et al. "When poll is better than interrupt." in FAST, vol. 12, 2012, pp. 3-3.

M. Hoseinzadeh et al., "Reducing access latency of mlc pcms through line striping," ACM SIGARCH Computer Architecture News, vol. 42, No. 3, pp. 277-288, 2014.

S. Ahn et al., "Improving i/o resource sharing of linux cgroup for nvme ssds on multi-core systems." in HotStorage, 2016.

Y. J. Yu, et al. "Optimizing the block i/o subsystem for fast storage devices," ACM Transactions on Computer Systems (TOCS), vol. 32, No. 2, p. 6, 2014.

"Erlang C Formula." [Online]. Available: https://en.wikipedia.org/wiki/Erlang_(unit)#Erlang_C_formula.

"MMC Queue." [Online]. Available: https://en.wikipedia.org/wiki/M/M/c_queue.

"NVM—Express," http://www.nvmexpress.org/.

"PCI Express Specification," http://pcisig.com/specifications/pciexpress/.

"SCSI Command." [Online]. Available: https://en.wikipedia.org/wiki/SCSI_command.

"VMware ESXi." www.vmware.com/products/vsphere-hypervisor.html.

"VMware Pluggable Storage Architecture Package" [Online]. Available: https://code.vmware.com/vmware-ready-programs/storage/psa.

"vsphere apis for i/o filtering (vaio) program," https://code.vmware.com/programs/vsphere-apis-for-io-filtering.

A. Huffman, "NVM Express specification 1.1a," http://www.nvmexpress.org/wp-content/uploads/NVM-Express-1_1a.pdf, Sep. 2013.

A. M. Caulfield et aL, "Moneta: A high-performance storage array architecture for next-generation, non-volatile memories," in Proceedings of the 2010,43rd Annual IEEE/ACM International Symposium on Microarchitecture, IEEE Computer Society, 2010, pp. 385-395.

A. M. Caulfield et aL, "Understanding the impact of emerging non-volatile memories on high-performance, io-Intensive computing," in Proceedings of the 2010, ACM/IEEE International Conference for High Performance Computing, Networking, Storage and Analysis. IEEE Computer Society, 2010, pp. 1-11.

B. C. Lee et al., "Architecting phase change memory as a scalable dram alternative," in ACM SIGARCH Computer Architecture News, vol. 37, No. 3, ACM, 2009, pp. 2-13.

C. Ruemmler et al., "An introduction to disk drive modeling," Computer, vol. 27, No. 3, pp. 17-28, 1994.

D. I. Shin et al., "Shedding light in the black-box: Structural modeling of modern disk drives," in Modeling, Analysis, and Simulation of Computer and Telecommunication Systems, 2007, Mascots'07, 15th International Symposium on IEEE, 2007, pp. 410-417.

E. H. Nam et al., "Ozone (o3): an out-of-order flash memory controller architecture," IEEE Transactions on Computers, vol. 60, No. 5, pp. 653-666, 2011.

H. Kim et al., "Evaluating phase change memory for enterprise storage systems: A study of caching and tiering approaches," ACM Transactions on Storage (TOS), vol. 10, No. 4, p. 15, 2014.

H. Volos et al., "Aerie: Flexible file-system interfaces to storage-class memory," in Proceedings of the Ninth European Conference on Computer Systems, ACM, 2014, p. 14.

H.-S. P. Wong et al., "Phase change memory," Proceedings of the IEEE, vol. 98, No. 12, pp. 2201-2227, 2010.

I. Newsroom, "Intel and micron produce breakthrough memory technology, Jul. 28, 2015." [Online]. Available: http://newsroom.intel.com/community/intel_newsroom/blog/2015/07/28/intel-and-micron-produce-breakthrough-memory-technology.

M. Hoseinzadeh et al., "Spcm: The striped phase change memory," ACM Transactions on Architecture and Code Optimization (TACO), vol. 12, No. 4, p. 38, 2016.

M. Lee et al., "Improving read performance by isolating multiple queues in nvme ssds," in Proceedings of the 11th International Conference on Ubiquitous Information Management and Communication. ACM, 2017, p. 36.

M. Oh et al., "Enhancing the i/o system for virtual machines using high performance ssds," in Performance Computing and Communications Conference (IPCCC), 2014 IEEE International. IEEE, 2014, pp. 1-8.

P. Kumar et al., "Falcon: Scaling io performance in multi-ssd volumes," in 2017 USENIX Annual Technical conference (USENIX ATC 17), USENIX Association, 2017, pp. 41-53.

R. Micheloni et al., "Inside Solid State Drives (SSDs)". Springer Publishing Company, Incorporated, 2012.

S.-S. Sheu et al., "A 4mb embedded slc resistive-ram macro with 7.2 ns. read-write random-access time and 160ns mlc-access capability," in Solid-State Circuits Conference Digest of Technical Papers (ISSCC), 2011 IEEE International, IEEE, 2011, pp. 200-202.

T.-S. Chung et al., "A survey of flash translation layer," Journal of Systems Architecture, vol. 55, No. 5, pp. 332-343, 2009. [Online]. Available: http://www.sciencedirect.com/science/article/pii/S1383762109000356.

W. Shin et al., "Os i/o path optimizations for flash solid-state drives." in USENIX Annual Technical Conference, 2014, pp. 483-488.

\* cited by examiner

```
1   Procedure IOSubmissionNVMeHypervisor()
2     while OSLibIOSubmit(ctrlr, vmkCmd, devData) do
3       submissionQueue = getSubmissionQueue(ctrlr);
4       IORequest = getIORequest(ctrlr,vmkCmd);
5       if !IORequest then
6         return VMK_NO_MEMORY;
7       IORequest.vmkCmd = vmkCmd;
8       IORequest.devData = devData;
9       OrigLink = submissionQueue.link;
10      IORequest.link = OrigLink;
11      while !sync(submissionQueue.lnk, OrigLnk, IORequest)
          do
12        OrigLink = submissionQueue.link;
13        IORequest.link = OrigLink;
14      callIOServ(submissionQueue);
15      return VMK_OK;
16  Procedure callIOServ (submissionQueue)
17    curIOServ=selectIOServ();
18    curIOServ.takeJob(submissionQueue);
19    return;
20  Procedure subQueueNum()
21    while True do
22      if currTime MOD epochLen = 0 then
23        $\lambda$ = updateArruRate();
24        $\vec{\mu}$ = regressSubQueueServRate($C_{max}$);
25        $c$ = optimizeServNum($\lambda, \vec{\mu}$);
26  Procedure optimizeServNum($\lambda, \vec{\mu}$)
27    return $\underset{c \in [1, c_{max}]}{argmin} \left[ \frac{ErlangC(\lambda, \vec{\mu_c})}{c\mu_c - \lambda} + \frac{1}{\mu_c} \right]$;
28  Procedure ErlangC ($\lambda, \vec{\mu_c}$)
29    $\rho = \frac{\lambda}{\mu_c}$;
30    return $\frac{1}{1+(1-\rho)\left(\frac{c!}{(c\rho)^c}\right)\sum_{k=0}^{c-1}\frac{(c\rho)^k}{k!}}$;
```

FIG. 5

```
1  Procedure IOSubmissionNVMeHypervisor()
2      userLib --> kernelDriver ;
3      /* Initialization */ ;
4      if curApp ∈ userLevelWhitelist then
5          new subQueue;
6          new compQueue;
7          subQueue.memoryRegion.map(curApp.memRegion);
8          compQueue.memoryRegion.map(curApp.memRegion);
9          curHandle=new handle(submissionQueue,
               completionQueue, doorbellReg);
10         curHandleList+=curHandle;
11     ForwardIOCmd(curHandleList, NVMeCtrlr);
```

FIG. 6

HYBRID FRAMEWORK OF NVME-BASED STORAGE SYSTEM IN CLOUD COMPUTING ENVIRONMENT

CROSS-REFERENCE TO RELATED APPLICATION

This patent application claims the priority benefit under 35 U.S.C. § 119(e) of U.S. Provisional Patent Application No. 62/540,555, filed on Aug. 2, 2017, the disclosure of which is incorporated herein by reference in its entirety.

TECHNICAL FIELD

The subject matter disclosed herein generally relates to non-volatile memory express (NVMe) systems, and more particularly, to a framework for an NVMe-based virtual machine-hypervisor (VM-Hypervisor) platform.

BACKGROUND

Recently, data centers have been replacing traditional Serial AT Attachment (SATA) and Serial Attached SCSI (SAS) solid-state drives (SSDs) with NVMe SSDs due to the outstanding performance associated with NVMe devices. For historical reasons, however, the current deployments of NVMe in virtual machine-hypervisor-based platforms, such as VMware ESXi, have many intermediate queues along the I/O path, which cause performance bottlenecked by locks in the queues. There may also be I/O response-time delays caused by cross-VM interference. Most significantly, however, the up-to-64K-queue capability of NVMe SSDs is not being fully utilized in virtual machine-hypervisor-based platforms.

SUMMARY

An example embodiment provides a non-volatile memory (NVM) express (NVMe) system that may include at least one user application, an NVMe controller, and a hypervisor. Each user application may be running in a respective virtual machine environment and including a user input/output (I/O) queue. The NVMe controller may be coupled to at least one NVM storage device and the NVMe controller may include a driver that includes at least one device queue. The hypervisor may be coupled to the user I/O queue of each user application and to the NVMe controller, and the hypervisor may force each user I/O queue to empty to a corresponding device queue in the driver of the NVMe controller. In one embodiment, the hypervisor may send false completion messages to each user I/O queue to force the user I/O queue to empty to a corresponding device queue in the driver of the NVMe controller. In one embodiment, the NVMe controller may select an idle I/O server to send I/O traffic in the device queue to an NVM storage device. In one embodiment, the hypervisor may determine an optimum number of device queues based on an Erlang function.

Another example embodiment provides a non-volatile memory (NVM) express (NVMe) system that may include at least one user application, an NVMe controller and a hypervisor. Each user application may be running in a respective virtual machine environment and including a user input/output (I/O) queue. The NVMe controller may be coupled to at least one NVM storage device, and the NVMe controller may include a driver that includes at least one device queue. The hypervisor may be coupled to the user I/O queue of each user application and to the NVMe controller. The hypervisor may enable a private I/O channel between the user I/O queue and a corresponding device queue in the driver of the NVMe controller. In one embodiment, the private I/O channel enabled between the user I/O queue and the corresponding device queue may be enabled for at least one thread of the corresponding user application. In another embodiment, each private I/O channel may include a corresponding I/O server in the driver of the NVMe controller.

Still another example embodiment provides a non-volatile memory (NVM) express (NVMe) system that may include at least one user application, an NVMe controller and a hypervisor. Each user application may be running in a respective virtual machine environment and including a user input/output (I/O) queue. The NVMe controller may be coupled to at least one NVM storage device, and the NVMe controller may include a driver that includes at least one device queue. The hypervisor may be coupled to the user I/O queue of each user application and to the NVMe controller. The hypervisor may selectively force each user I/O queue to empty to a corresponding device queue in the driver of the NVMe controller or may enable a private I/O channel between the user I/O queue and a corresponding device queue in the driver of the NVMe controller. In one embodiment, if the hypervisor selectively forces each user I/O queue to empty, the hypervisor sends false completion messages to each user I/O queue to force the user I/O queue to empty to a corresponding device queue in the driver of the NVMe controller, and if the hypervisor selectively enables a private I/O channel between the user I/O queue and a corresponding device queue the private I/O channel, the hypervisor enables the private channel for at least one thread of the corresponding user application.

BRIEF DESCRIPTION OF THE DRAWINGS

In the following section, the aspects of the subject matter disclosed herein will be described with reference to exemplary embodiments illustrated in the figures, in which:

FIG. 5 depicts pseudocode for an example process of the parallel queue mode according to the subject matter disclosed herein;

FIG. 6 depicts pseudocode for an example process of the first access mode according to the subject matter disclosed herein.

DETAILED DESCRIPTION

Figure 1:
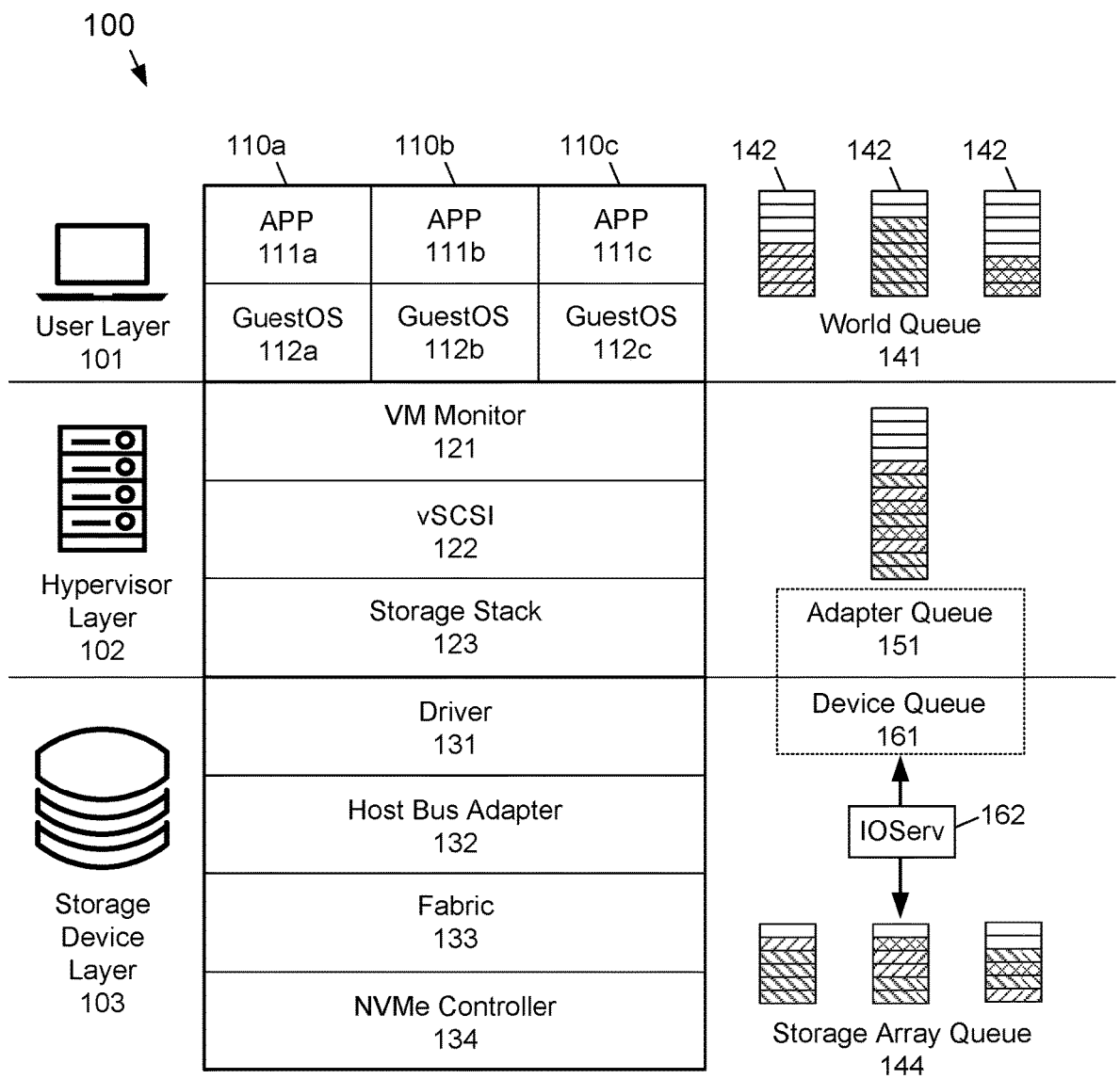
FIG. 1 depicts a simplified block diagram of a conventional NVMe-based VM-Hypervisor platform.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments disclosed herein provide a hybrid framework for an NVMe-based VM-Hypervisor platform. The hybrid framework, which is referred to herein as "H-NVMe," provides two virtual machine (VM) I/O path-deployment modes. A cloud manager may select from the two modes of the H-NVMe framework for VM deployment in an NVMe-based storage system. The first mode, referred to herein as a Parallel Queue Mode (PQM), increases parallelism and enables lock-free operations by forcing the adapter queue of the hypervisor to be empty, and using enhanced queues in the NVMe driver to accelerate I/O requests. The second mode, referred to herein as a Direct Access Mode (DAM), may achieve better performance than the PQM by bypassing all queues in the hypervisor layer by using an IOFilter file that is attached to each VM disks (VMDKs), thereby allowing the threads of user applications to directly access NVMe driver queues. Although the second mode may break the encapsulation of the storage resources provided by a hypervisor platform, the DAM may suit premium users that may have higher permission-control processes. Specifically, currently a hypervisor abstracts the storage resource into virtualized disks, and VMs have almost no knowledge of the physical information of the disks they are using, and in particular, the VMs cannot directly access their I/O streams to the up-to-64K queues in the NVMe SSDs. In one embodiment, the H-MVMe framework disclosed herein may achieve at least a 50% throughout improvement compared to conventional NVMe solutions.

FIG. 1 depicts a simplified block diagram of a conventional NVMe-based VM-Hypervisor platform 100. In one embodiment, the VM Hypervisor platform 100 depicted in FIG. 1 may be based on the VMware ESXi Pluggable Storage Architecture (PSA). The conventional VM-Hypervisor platform 100 may include a user layer 101, a hypervisor layer 102, and a storage device layer 103.

The user layer 101 may include a plurality of virtual machines, of which only virtual machines 110a-110c are indicated. Each virtual machine 110 may be running an application APP 111 under an operating system GuestOS 112. The respective operating systems GuestOS 112 may be different from each other.

The hypervisor layer 102 may include a VM monitor 121, a virtual SCSI interface vSCSI 122, and a storage stack 123. The VM monitor 121 may directly monitor and manage each of the virtual machines 110 existing at the user layer 101. The vSCSI 122 may provide a virtual SCSI interface to each virtual machine monitored and maintained by the VM monitor 121. The storage stack 123 may be used to manage the I/O traffic between the vSCSI 122 and the storage layer 103.

The storage device layer 103 may include a plurality of NVMe SSD devices (not indicated), a driver 131, a host bus adapter 132, a network fabric 133 and one or more NVMe controllers 134, of which only one NVMe controller is indicated. The driver 131 may receive the I/O traffic from the storage stack 123 and direct the I/O traffic to the host bus adapter 132. The host bus adaptor may control the I/O traffic over the network fabric 133 to the NVMe controller 134, which may control I/O traffic to and from an NVMe SSD device (not indicated). There are up to 64K I/O queues that are available in the NVMe controller 134.

There may be multiple intermediate queues in the I/O path between the user layer 101 and the storage device layer 103. When an I/O request enters the I/O path in the conventional NVMe-based VM-Hypervisor platform 100, the following process generally occurs. In the user layer 101, the platform world queue 141 is responsible for each VM I/O request. There may be one or more I/O queues 142 for each VM 110. The hypervisor layer 102 includes an adapter queue 151 that may gather the I/O requests from the world queue 141. The hypervisor 102 may translate each I/O request into a SCSI command and may send the translated I/O request to a device queue 161 in the driver 131. An IOServ (I/O server) 162 in the driver 131 may acquire an internal completion spin lock for the I/O request. The driver 131 may send the I/O request to an NVMe device (not indicated) via an NVMe controller 134. The driver 131 may then wait for the NVMe device to complete the I/O request while holding the lock. When the I/O request has completed, the driver 131 may release the spin lock and may complete the I/O asynchronously when an NVMe controller I/O completion interrupt occurs. The overall process includes a significant bottleneck that may occur between the adapter queue 151 at the hypervisor layer 102 and the device queue 161 at the storage device layer 103, which may cause the conventional platform 100 to not best utilize the up-to-64K queues in the NVMe controller 134. The bottleneck may also include cross-VM interference issues.

The conventional NVMe-based VM-Hypervisor platform 100 completes nearly all I/O requests asynchronously via interrupts. Historically, interrupt-driven I/O may be efficient for high-latency devices, such as hard disks, but interrupt-driven I/O may also introduce a significant amount of overhead that includes many context switches. Moreover, interrupt-driven I/O requests are not efficient for NVMe SSDs. More importantly, an interrupt-driven approach is not lock-free and thereby limits the parallel I/O capacity of the conventional NVMe-based VM-Hypervisor platform 100 because an upper layer IOServ (i.e., an I/O server having a role to serve each I/O requests, and may have different names in different hypervisor solutions) will not send another I/O until a previous submitted I/O returns a pending status. Consequently the multiple cores/multiple-queue mechanisms of the NVMe devices are not fully utilized.

Figure 2:
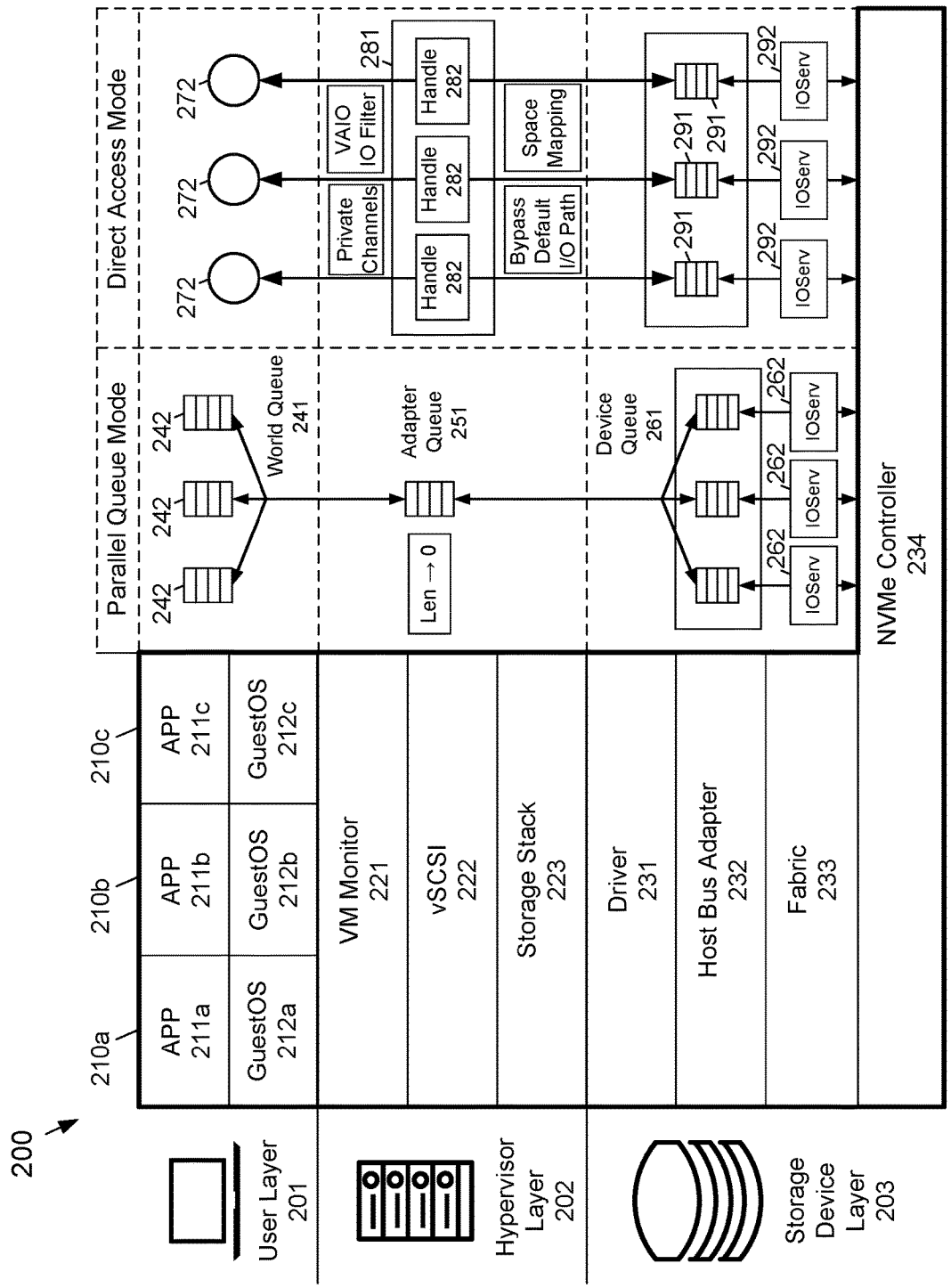
FIG. 2 depicts a simplified block diagram of an NVMe-based VM-Hypervisor platform according to the subject matter disclosed herein.

FIG. 2 depicts a simplified block diagram of an NVMe-based VM-Hypervisor platform 200 according to the subject matter disclosed herein. Similar to the VM-Hypervisor platform 100 depicted in FIG. 1, the VM-Hypervisor platform 200 may include a user layer 201, a hypervisor layer 202, and a storage device layer 203.

The user layer 201 may include a plurality of virtual machines, of which only virtual machines 210a-210c are indicated. Each virtual machine 210 may be running an application APP 211 under an operating system GuestOS 212. The respective operating systems GuestOS 212 may be different from each other.

The hypervisor layer 202 may include a VM monitor 221, a virtual SCSI interface vSCSI 222, and a storage stack 223. The VM monitor 221 may directly monitor and manage each of the virtual machines 210 existing at the user layer 201. The vSCSI 222 may provide a virtual SCSI interface to each virtual machine monitored and maintained by the VM monitor 221. The storage stack 223 may be used to manage the I/O traffic between the vSCSI 222 and the storage layer 203.

The storage device layer 203 may include a plurality of NVMe SSD devices (not indicated), a driver 231, a host bus adapter 232, a network fabric 233 and one or more NVMe controllers 234, of which only one NVMe controller is indicated. The driver 231 may receive the I/O traffic from the storage stack 223 and direct the I/O traffic to the host bus adapter 232. In one embodiment, the host bus adaptor may control the I/O traffic over the network fabric 233 to the NVMe controller 234, which may control I/O traffic to and from an NVMe SSD device (not indicated). There are up to 64K I/O queues that are available in the NVMe controller 233.

The H-NVMe framework permits an operator of the NVMe platform 200 to select either the parallel queue mode or the direct access mode for a particular VM. As depicted in the center portion of FIG. 2, in the parallel queue mode the adapter queue 251 of the hypervisor layer 202 is forced to be emptied (i.e., len→0) by the device queue 261 sending "false" completion signals so that I/O requests in the respective user queues 242 of the world queue 241 are sent to the device queue 261. After the I/O requests are received in the device queue 261, the parallelism of the I/O servers 262 speeds up the I/O request process by each I/O server 262 focusing only on the I/O request contents of their respective queue.

Figure 3:
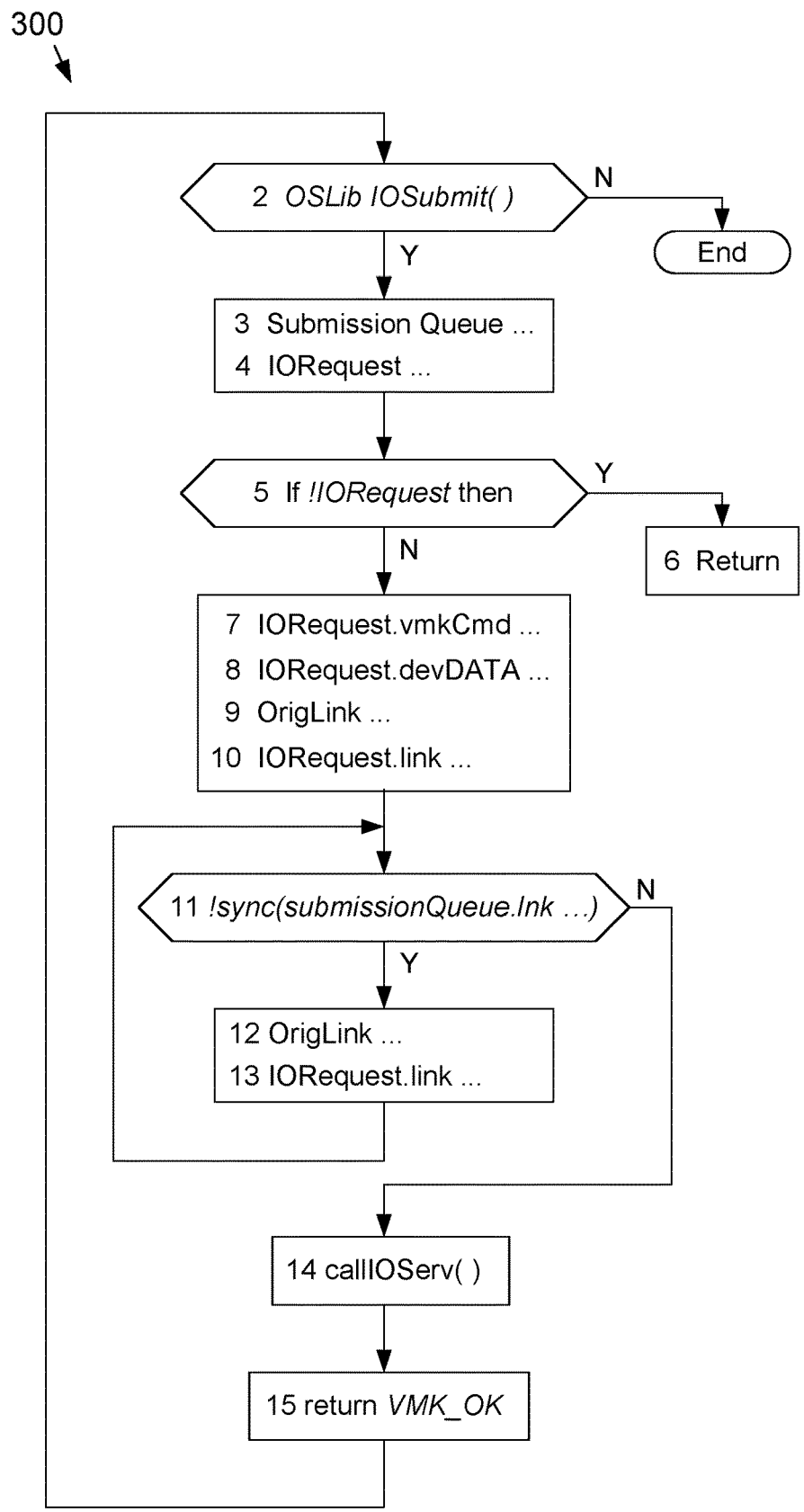
FIG. 3 depicts the example parallel queue mode process set forth in FIG. 5 in a flowchart format.

FIG. 5 sets forth pseudocode for an example process of the parallel queue mode. FIG. 3 depicts the example parallel queue mode process set forth in FIG. 5 in a flowchart format with the line numbers in FIG. 5 indicated in the FIG. 3.

Unlike the conventional NVMe VM-Hypervisor platform 100 that has a lock issue, more than one thread and subqueue may be created in the queue of the driver 231 of H-NVMe framework 200 so that a plurality of IO servers 262 may handle the I/O requests with the NVMe controller 234. Consequently, a lock-free operation may be achieved by multiple IOServ threads by focusing on their own queue. (See, for example, lines 11-13 of the process in FIG. 5.) In particular, the callIOServ function selects an idle IOServ in order to assign jobs in a round-robin manner.

While having multiple IO servers 262 may improve performance, but it should be kept in mind that increasing the number of IO servers 262 may also cause more processing and memory resources to be occupied by the additional threads formed by the multiple IO servers 262. Additionally, as the number of IO servers 262 increase, the service rate of each IO server 262 may decrease accordingly. An adaptive process that may be used to determine an appropriate number of IO servers 262 may be as follows. As the length of the adapter queue 251 is forced to be 0, the problem of determining how to dynamically assign subqueue and IO servers may be addressed using the M/M/c queuing theory. For example, let the total arrival rate from the adapter queue to be $\lambda$, and let vector $\vec{\mu}$ to denote each IOServ's service rate. The vector $\vec{\mu}$ has c dimensions, in which $c \in [1, c_{max}]$ is the number of IOServs, and $c_{max}$ is the preset maximal IOServ number. If the number c is increased, the service rate of each server will change, and the change may be estimated by a regression function based on periodically measurement. (See, for example, line 24 of the process in FIG. 5.) Once $\lambda$ and $\vec{\mu}$ have been determined, the H-NVMe framework calls the optimizeServNum( ) function to determine the best number for c.

The optimization objective of in this process is to minimize the total latency. Specifically, different combinations of c and corresponding service rates may be tested. This procedure may also use the ErlangC function to calculate the probability that an arriving job will need to be queued as opposed to being immediately served. Lastly, in order to reduce the cost of changing c, the frequency of updating c may be limited to a preset update epoch window epochLen. (See, for example, line 22 of the process in FIG. 5.)

Although PQM may improve queuing performance of an NVMe-based VM-Hypervisor platform by moving all I/O request from the adapter queue of the hypervisor to customized multiple subqueues in the driver queue, the PQM still may not simplify the complex I/O stack and, consequently, may not fully utilize the low latency of the NVMe SSDs and avoid cross-VM interference due to shared queues. To thoroughly reduce the I/O path complexity and to support performance isolation, the Direct Access Mode of the H-NVMe framework provides a user-space I/O framework to fully utilize the performance of NVMe SSDs, while meeting diverse requirements associated with different user applications.

As depicted in the rightmost portion of FIG. 2, in the direct access mode the H-NVMe framework bypasses the multiple queues in the original I/O path through the hypervisor layer 102, and provides handles to grant each application in the user layer 201 a root privilege to manage the access permission of I/O queues. In one embodiment, the H-NVMe framework attaches a VM Daemon (IOFilter) to each of the VMDKs for polling I/O requests, thereby allowing the threads of user applications to directly access NVMe driver queues.

Each user thread 272 may be assigned to an application 211 inside the respective VMs 210. A user-mode application 211 may use different I/O queues for different I/O sizes and may implement different polling strategies. The I/O request submissions and completions do not require any driver interventions. As shown at 281, a handle 282 will bypass all other I/O paths in the hypervisor layer 202, and will map the user space to the NVMe space.

Figure 4:
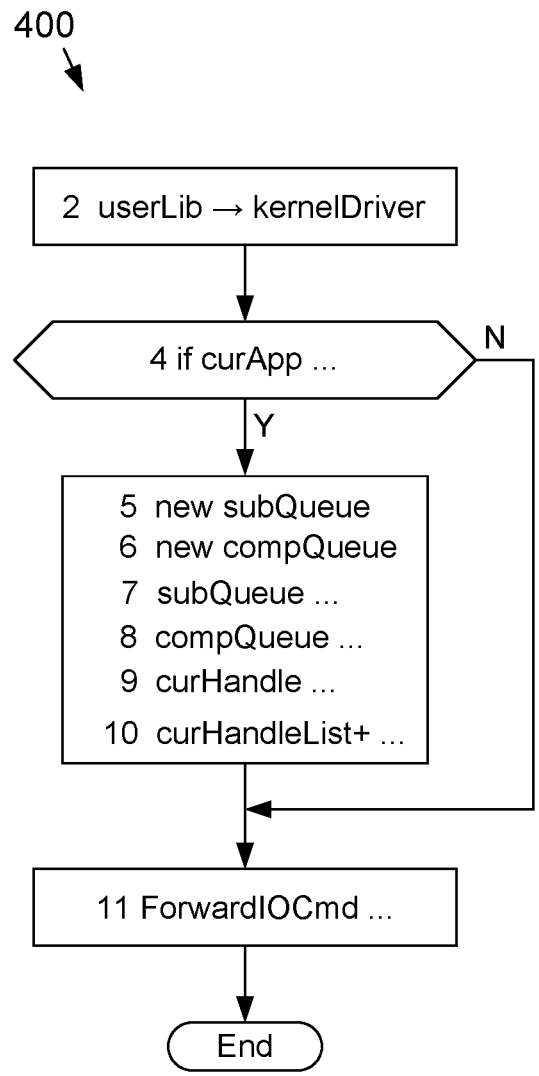
FIG. 4 depicts the example direct access mode process set forth in FIG. 6 in a flowchart format.

FIG. 6 sets forth pseudocode for an example process of the direct access mode. FIG. 4 depicts the example direct access mode process set forth in FIG. 6 in a flowchart format with the line numbers in FIG. 6 indicated in the FIG. 4.

A device driver queue 291 may be directly assigned to each handle 282 without an I/O request being forwarded by the world queue at the user layer 201 and the adapter queue at the hypervisor layer 202. An IO server 292 handles the I/O requests directly received by a device driver 291 by sending an I/O request to the NVMe controller 234.

When an application 211 requests a single I/O queue in the DAM, the H-NVMe framework checks whether the application 211 is allowed to perform user-level I/O requests to the storage device layer 203. If the application is in a whitelist to perform user-level I/O, which may be preset based on the SLA and security audit requirements associated with the user, the H-NVMe framework creates a submission queue and a completion queue. (See, for example, lines 4-6 of the process in FIG. 6.) The H-NVMe framework also maps the memory regions of the submission queue and the completion queue including any associated doorbell registers to the user-space memory region for the application 211. (See, for example, lines 7-8 of the process of FIG. 6.) After the initialization process, an application 211 may issue I/O commands directly to the NVMe SSD without any hardware modification or help from the kernel I/O stack. (See, for example, lines 9-11 of the process or Table 2.)

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A non-volatile memory (NVM) express (NVMe) system, comprising:
at least one user application running in a respective virtual machine environment and including a user input/output (I/O) queue;
an NVMe controller coupled to at least one NVM storage device, the NVMe controller comprising a driver that includes at least one device queue; and
a hypervisor comprising a queue coupled to the user I/O queue of the user application and to the NVMe controller, wherein the queue of the hypervisor is configured to be emptied in response to one or more false completion messages corresponding to one or more I/O requests, and the user I/O queue of the at least one user application is configured to send I/O requests to the at least one device queue based on the queue of the hypervisor being emptied.

2. The NVMe system of claim 1, wherein the NVMe controller selects an idle I/O server to send I/O traffic in the device queue to an NVM storage device.

3. The NVMe system of claim 1, wherein the hypervisor determines an optimum number of device queues based on an Erlang function.

4. The NVMe system of claim 3, wherein the hypervisor further selectively empties the user I/O queue to a corresponding device queue in the driver of the NVMe controller or selectively enables a private I/O channel between the user I/O queue and a corresponding device queue in the driver of the NVMe controller that bypasses queues in the hypervisor.

5. The NVMe system of claim 4, wherein the private I/O channel enabled between the user I/O queue and the corresponding device queue is enabled for at least one thread of a corresponding user application.

6. The NVMe system of claim 5, wherein the private I/O channel includes a corresponding I/O server in the driver of the NVMe controller.

7. The NVMe system of claim 4, wherein the private I/O channel between the user I/O queue and the corresponding device queue in the driver of the NVMe controller is enabled based on a permission level.

8. The NVMe system of claim 7, wherein the permission level comprises a permission level of the user application.

9. A non-volatile memory (NVM) express (NVMe) system, comprising:
at least one user application running in a virtual machine environment and including at least one user thread;
an NVMe controller coupled to at least one NVM storage device, the NVMe controller comprising a driver that includes at least one device queue; and
a hypervisor coupled to the user I/O queue of the user application and to the NVMe controller, the hypervisor enabling a private I/O channel between the user thread and a corresponding device queue in the driver of the NVMe controller that bypasses a queue in the hypervisor;
wherein the hypervisor further selectively enables the private I/O channel between the user thread and the corresponding device queue in the driver of the NVMe controller or wherein the queue of the hypervisor is configured to be emptied in response to one or more false completion messages corresponding to one or more I/O requests and the user I/O queue of the at least one user application is configured to send I/O requests to the at least one device queue based on the queue of the hypervisor being emptied.

10. The NVMe system of claim 9, wherein the private I/O channel enabled between the user thread and the corresponding device queue is enabled for the user thread of the user application.

11. The NVMe system of claim 10, wherein the private I/O channel includes a corresponding I/O server in the driver of the NVMe controller.

12. The NVMe system of claim 10, wherein the private I/O channel between the user I/O queue and the corresponding device queue in the driver of the NVMe controller is enabled based on a permission level.

13. The NVMe system of claim 12, wherein the permission level comprises a permission level of the user application.

14. The NVMe system of claim 9, wherein the NVMe controller selects an idle I/O server to send I/O traffic in the device queue to an NVM storage device.

15. The NVMe system of claim 14, wherein the hypervisor determines an optimum number of device queues based on an Erlang function.

16. A non-volatile memory (NVM) express (NVMe) system, comprising:
- at least one user application running in a virtual machine environment and including a user input/output (I/O) queue and at least one user thread;
- an NVMe controller coupled to at least one NVM storage device, the NVMe controller comprising a driver that includes at least one device queue; and
- a hypervisor comprising a queue coupled to the user I/O queue of the user application and to the NVMe controller, wherein the queue of the hypervisor is configured to be emptied in response to one or more false completion messages corresponding to one or more I/O requests, and the user I/O queue of the at least one user application is configured to send I/O requests to the at least one device queue based on the queue of the hypervisor being emptied, or the hypervisor selectively enables a private I/O channel between the user thread and a corresponding device queue in the driver of the NVMe controller that bypasses the queue in the hypervisor.

17. The NVMe system of claim 16, wherein the hypervisor enables the private I/O channel for the user thread based on the hypervisor selectively enabling the private I/O channel between the user thread and the corresponding device queue.

18. The NVMe system of claim 9, wherein:
- the driver implements a handle that bypasses the hypervisor and maps a user space of the user application to an NVMe space; and
- I/O commands from the user application are issued directly to the NVM storage device without driver interventions.

* * * * *